United States Patent [19]

Capps

[11] Patent Number: 4,715,768
[45] Date of Patent: Dec. 29, 1987

[54] BOAT TRAILER GUIDE

[76] Inventor: Lloyd O. Capps, Rte. 5, Box 445, Claremore, Okla. 74017

[21] Appl. No.: 887,745

[22] Filed: Jul. 21, 1986

[51] Int. Cl.$^4$ .............................................. B60P 3/10
[52] U.S. Cl. .................................. 414/535; 280/414.1; 414/529
[58] Field of Search ............... 414/535, 532, 533, 534, 414/529; 280/414.1, 529

[56] References Cited

U.S. PATENT DOCUMENTS

| | | |
|---|---|---|
| 3,021,969 | 2/1962 | Peake et al. |
| 3,026,981 | 3/1962 | Youtie |
| 3,122,736 | 2/1964 | Weber |
| 3,438,524 | 4/1969 | Snodgrass ........................... 414/532 |
| 3,447,815 | 6/1969 | West |
| 3,603,465 | 9/1971 | King |
| 3,608,754 | 9/1971 | Park ................................... 414/534 |
| 3,621,501 | 11/1971 | Jordan |
| 3,788,502 | 1/1974 | Bell |
| 3,837,509 | 9/1974 | Gladnick ............................. 414/529 |
| 3,868,030 | 2/1975 | Bell |
| 3,887,093 | 6/1975 | Howell ................................ 414/532 |
| 4,010,962 | 3/1977 | Groblebe ........................... 280/414.1 |
| 4,011,958 | 3/1977 | Carrick ............................... 414/529 |
| 4,268,211 | 5/1981 | Schwebke .......................... 414/535 |
| 4,529,217 | 7/1985 | Wood ............................... 414/529 X |

Primary Examiner—Peter A. Aschenbrenner
Attorney, Agent, or Firm—Robert B. Stevenson

[57] ABSTRACT

An improved boat trailer guide-on comprising bracket means that adjustably attaches to a conventional boat trailer and holds a substantially vertical shaft means with telescopically extendable foamed plastic rollers thereon. Such a device allows the roller to float upwards as the boat trailer is backed into the water, thus remaining visible and capable of assisting in the loading and unloading of a boat. Optionally, the top of the floating, telescopically extendable, roller is equipped with a tail light lamp for assisting in loading and unloading after dark.

3 Claims, 6 Drawing Figures

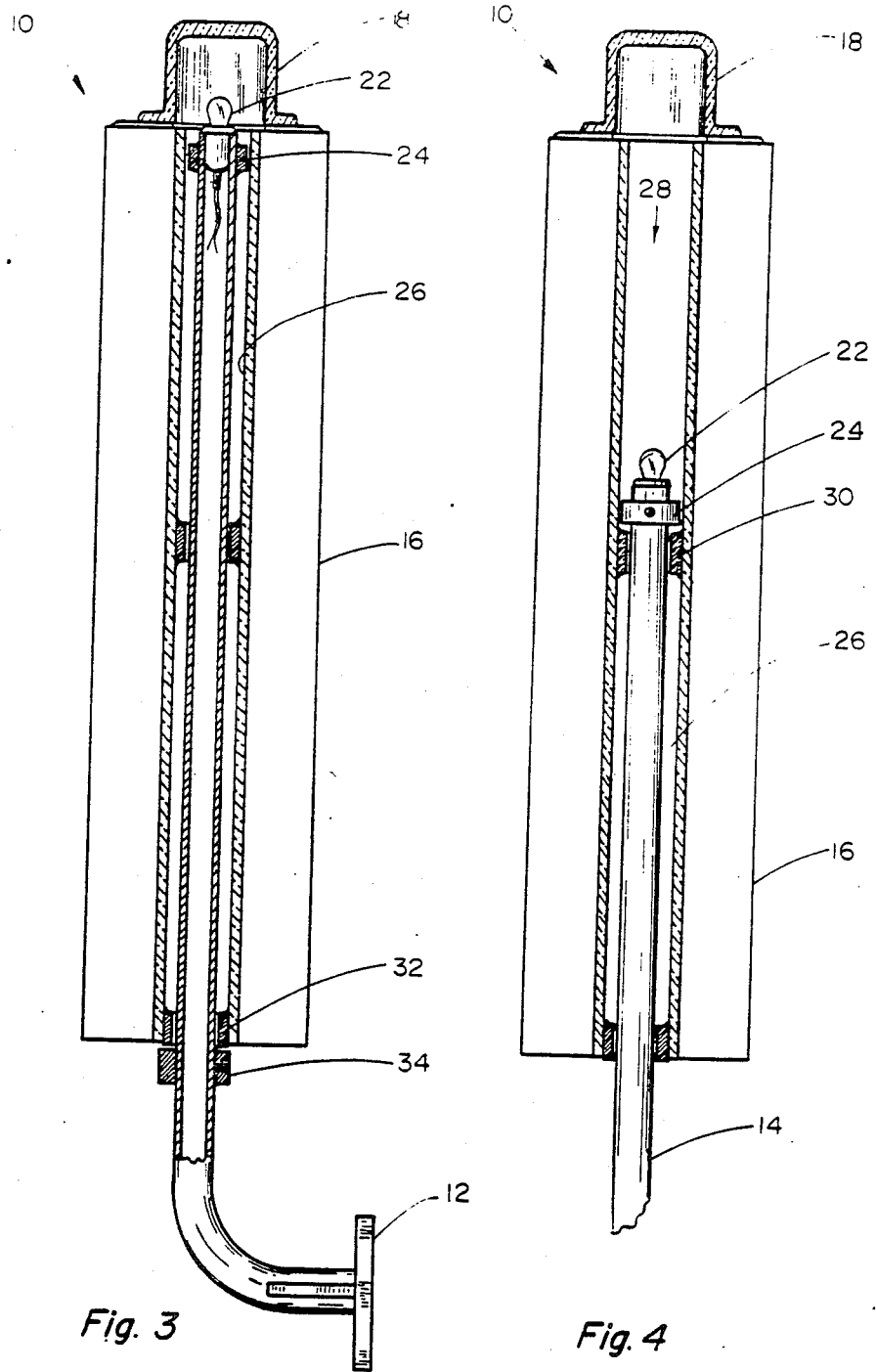

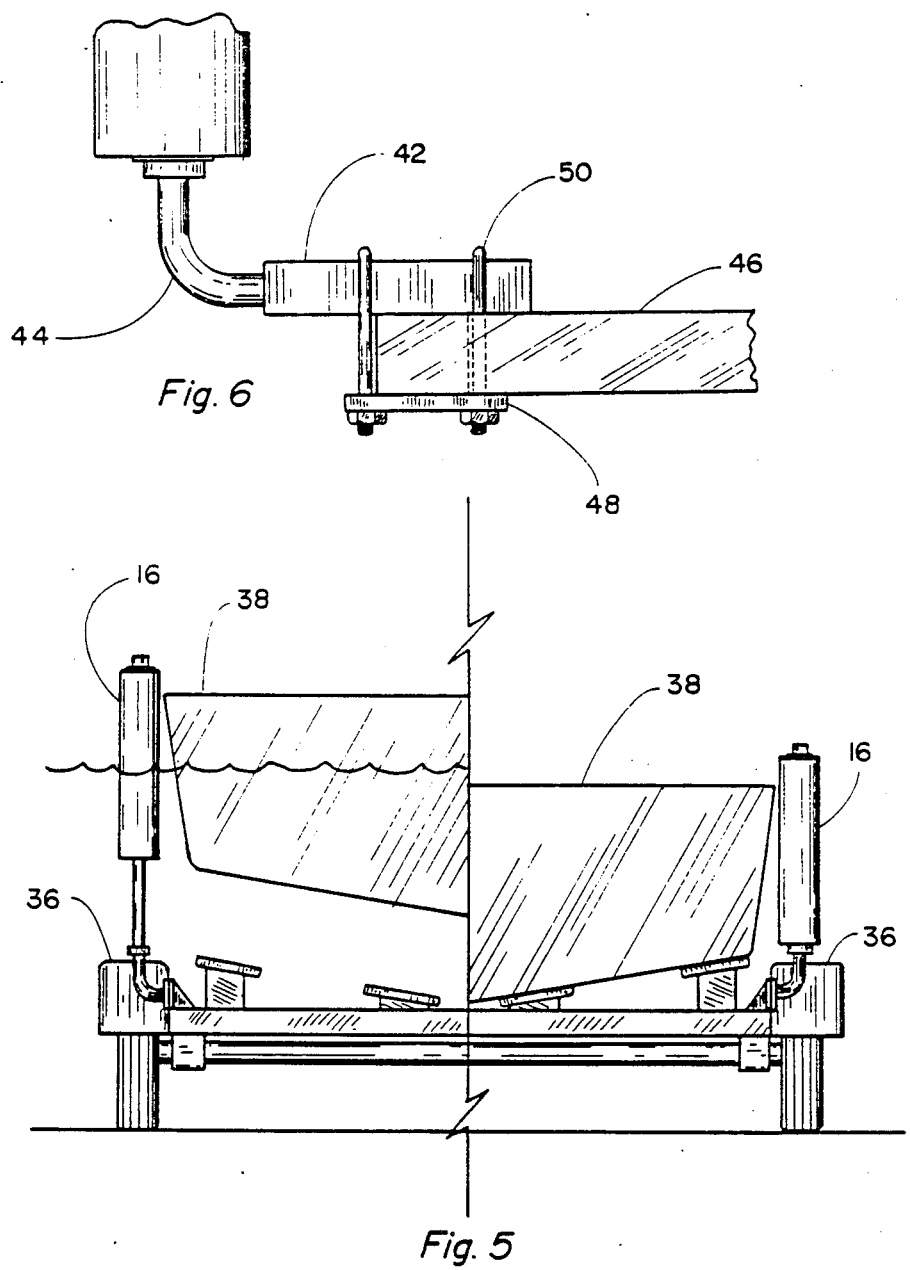

BOAT TRAILER GUIDE

BACKGROUND OF THE INVENTION

1. Field of the Invention:

This invention relates to a lighted boat trailer guide for assisting in floating a boat on and off of a trailer. More specifically, but not by way of limitation, the present invention relates to a boat guide that floats and as such, automatically extends and retracts as the trailer is submerged or withdrawn from the water.

2. Description of the Prior Art:

During the course of floating a pleasure craft or small boat on and off of a conventional boat trailer, problems associated with water currents, wave action and wind are frequently encountered. As such, it is not uncommon for a person performing such a task to wade out into the water and hold the boat or to use ropes and the like while another person winches in the boat and/or pulls the trailer slowly out of the water. Such techniques are somewhat dangerous and difficult, particularly when the depth of the trailer below the water line is excessive and uncontrollable. In such circumstances, it would be ideal if a guide or stabilizer means could be provided that allows for positioning the boat over the trailer independent of how deep the trailer is below the water line. The present invention is viewed as providing such a boat trailer guide.

SUMMARY OF THE INVENTION

The improved boat trailer guide or so-called "guide-on" according to the present invention involves a cylindrical float made of foamed polymeric material mounted on a vertically held shaft attached to a conventional boat trailer such that the float can both revolve around the shaft and as such, act as a protective roller or guide-on as well as extend telescopically on the shaft such as to be visible and operative above the water line when the boat trailer is partially or entirely submerged. The guide-on according to the present invention can be further provided with internal lighting which illuminates the top of the telescopically extendable roller for assisting in loading and unloading a boat after dark as well as serving as tail lights for the boat trailer.

Thus, the present invention provides a boat trailer guide comprising:

(a) a bracket means for attaching to a boat trailer and adapted to hold a shaft means substantially vertical and adjacent to the side of a boat supported on a trailer;

(b) a shaft means for supporting a floatable roller wherein the shaft means is attachable to the bracket means and adapted to be held substantially vertical and adjacent to the side of a boat supported on a trailer when the bracket means is attached to a boat trailer; and (c) a floatable roller attached to the shaft means and adapted to rotate about the shaft means as well as to float upwardly and extend telescopically on the shaft means, thus extending the boat guide vertically, when a boat trailer to which the bracket means is attached such as to hold the shaft means substantially vertical is lowered below water.

In one particular embodiment, the boat trailer guide further comprises a light source means mounted within the boat trailer guide with a protective lens attached at the upper end of the floatable roller such as to illuminate the top of the floatable roller even when extended.

It is an object of the present invention to provide a boat trailer guide-on or stabilizer means that attaches to the boat trailer and telescopically adjusts to the depth of water over the trailer during loading and unloading of a boat. It is a further object of the present invention to provide such a guide-on wherein the telescopic adjustment for depth of water is achieved by floatation of the guide-on roller and that the floating roller is capable of being illuminated to assist in positioning the boat on the trailer after dark. Fulfillment of these objects and the presence and fulfillment of other objects will be apparent upon complete reading of the specification and claims taken in conjunction with the drawings.

BRIEF DESCRIPTION OF HTE DRAWINGS

FIG. 3 is a partial cross-sectional side view of the boat trailer guide of FIG. 2 unextended.

FIG. 4 is a partial cross-sectional side view of the boat trailer guide of FIG. 2 in a telescopically extended configuration.

FIG. 5 illustrates the boat trailer guide according to the present invention mounted to a boat trailer with a boat being floated on or off of the trailer on the left and with the boat resting on the trailer on the right.

FIG. 6 illustrates an alternate bracket mechanism for adjustably attaching the boat trailer guide to the frame of a boat trailer.

DESCRIPTION OF THE PREFERRED EMBODIMENTS

Figures 1, 2:
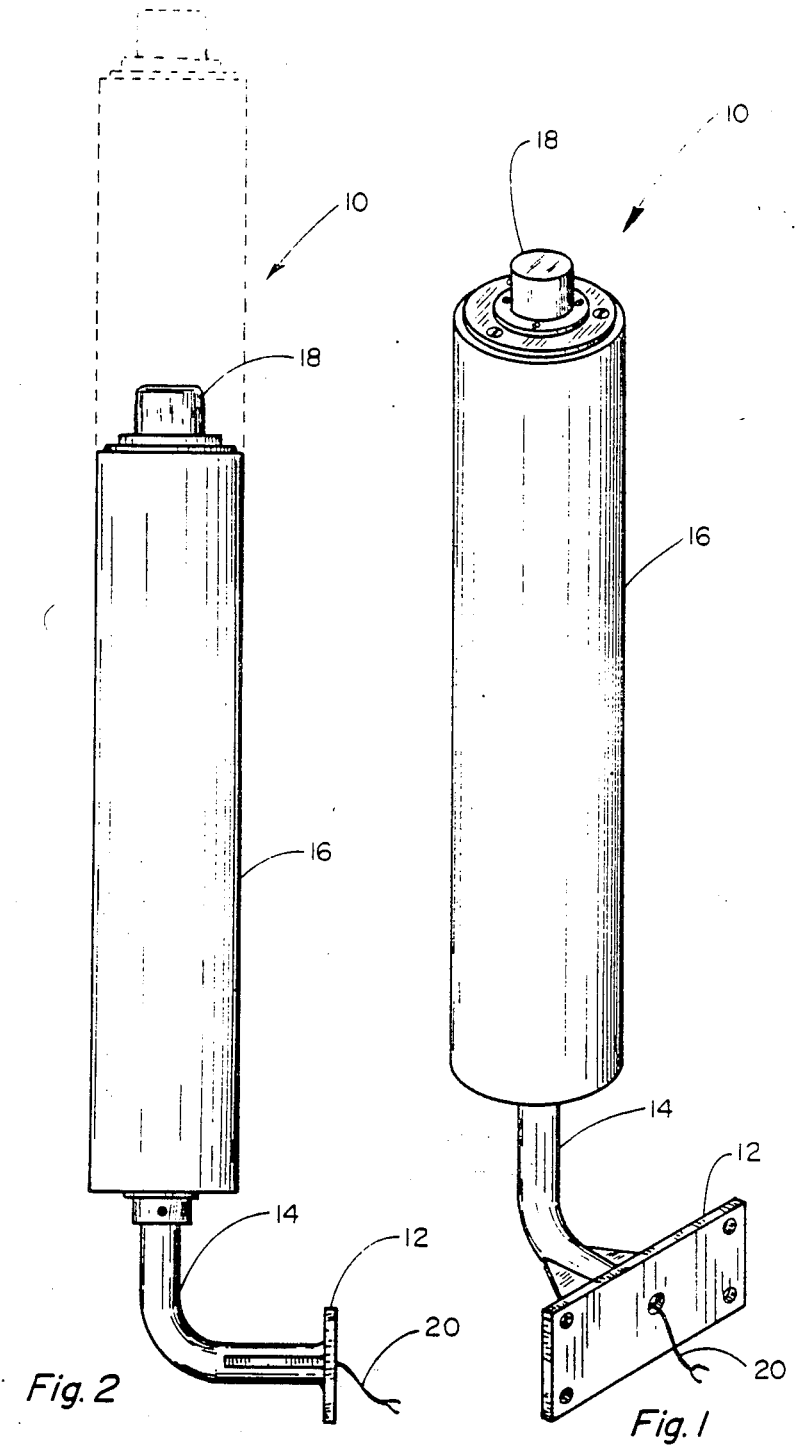
FIG. 1 is a perspective view of the boat trailer guide according to the present invention.
FIG. 2 is a side view of the boat trailer guide of FIG. 1 illustrating the telescopic extension feature in silhouette by use of dashed lines.

The improved boat trailer guide according to the present invention, how it attaches to a conventional boat trailer and how it functions as a telescopically floating guide-on and the advantages associated with its use can perhaps be best explained and understood by reference to the attached drawings. FIGS. 1 and 2 illustrate one particular embodiment of the improved boat guide according to the present invention, generally designated by the numeral 10. As illustrated, the guide 10 comprises a bracket means 12 that can be attached by appropriate bolts or the like (not shown) to the frame of a conventional boat trailer. Attached to the bracket 12 is a shaft means 14 which during use of the boat trailer guide 10 is positioned substantially vertical such as to allow the concentrically positioned floatable roller 16 to simultaneously telescopically extend (see silhouetted outline of extended position in FIG. 2) and revolve on the central shaft 14. On the top of the telescopically extendable, floatable roller 16 is a light lens 18 which when illuminated assists the user in locating the position of the roller and hence, the boat trailer, particularly after dark. As further illustrated in FIGS. 1 and 2, the wiring 20 for the lighting of the guide 10 exits the hollow shaft 14 at the bracket 12, thus allowing the device to be part of the boat trailer tail light system (again, not shown).

As further illustrated in the partial cross-sectional views of FIGS. 3 and 4, the shaft 14 has a light 22 mounted at the top internal to the guide 10 and the lens 18 is fastened to the top outside of the floatable roller 16. As such, the light, in this specific embodiment, remains stationary when the roller is telescopically extended (see FIG. 4). Positioned directly below the light 22 is the first of four stops 24 located within the annulus 26 formed between the axial opening 28 of roller 16 and shaft 14 extending through this opening 28. As seen in FIG. 4, stop 24 comes to rest on the top of stop 30 located midway on the shaft 14 when the roller 16 is fully extended. As such, stops 24 and 30 prevent the roller from floating off the trailer guide 10 when excessive water depths are encountered. As such, the onset of submersion of the upper part of the roller and the lens of the fully extended roller can serve as a criteria to the user of proper water depths to load or unload a boat. The other two stops 32 and 34 are positioned at the lower portion of the roller 16 and shaft 14 such that they come to rest with or engage to each other when the roller is fully contracted (i.e., boat trailer not submerged). In this configuration, the roller 15 will be properly positioned to the side of the boat such as to prevent side to side movement of the boat on the trailer as well as to allow the light to supplement and act as a trailer turn signal, brake and/or running light.

As conceptually illustrated in FIG. 5, the boat trailer 36 having a guide-on 10 mounted to both sides of the rear of the trailer will inherently result in the protective rollers 16 rising and falling (the floating action) with the boat 38 as a function of the water level. As such, the pair of guide-ons (one on each side of the boat trailer) will restrain the floating boat from side motion during loading and unloading and will also serve as support arms to assist in aligning the boat over the center of the trailer. This in turn significantly reduces the effort and alleviates the problems associated with loading and unloading of a boat on and off of a conventional boat trailer, even in the presence of wave action and cross winds. It is felt that the unexpected ease of operation associated with the use of a pair of guide-ons according the present invention serves to readily distinguish the present invention from the prior art boat guides. This in combination with the added advantages associated with the illumination of the top of the guide results in a versatile, safe and convenient mechanism for use with a conventional boat trailer.

FIG. 6 illustrates an alternate bracket means for use in the improved guide-on according to the present invention. The bracket means 40 comprises a rectangular cross-sectioned or other appropriate cross-sectioned horizontal extension 42 attached to the lower end of a shaft 44 holding the telescopically extendable, floatable roller (not shown). This horizontal member 44 can be adjustably positioned on any convenient frame member 46 of the trailer and then bolted or otherwise fastened by use of a support plate 48 and U-bolts 50 or the equivalent. As such, this particular embodiment of the guide-on can be adjusted so that the rollers are essentially adjacent to and making contact with the boat when the boat is positioned on the trailer.

The actual construction of the improved boat trailer guide-on of the present invention can be out of any material well known in the art. For example, the floating roller can be fabricated from any of the well known foamed plastics, including, but not limited to, foamed polyurethane, foamed polystyrene, and the like. Preferably, the central opening in the foamed cylinder is sleeved with plastic such as PVC pipe or the like and the vertical shaft and bracket are preferably made of metal or other structural material. The lens and lighting is preferably assembled using conventional automotive or trailer light components as generally known in the art.

Having thus described the invention with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

I claim:

1. A boat trailer guide comprising:
   (a) a bracket means for attaching to a boat trailer and adapted to hold a shaft means substantially vertical and adjacent to the side of a boat support on a trailer;
   (b) a shaft means for supporting a floatable roller wherein said shaft means is attachable to said bracket means and adapted to be held substantially vertical and adjacent to the side of a boat supported on a trailer when said bracket means is attached to a boat trailer; and
   (c) a floatable roller attached to said shaft means and adapted to rotate about said shaft means as well as to float upwardly and extend telescopically on said shaft means, thus extending the boat guide vertically, when a boat trailer to which said bracket means is attached such as to hold said shaft means substantially vertical is lowered below water.

2. A boat trailer guide of claim 1 further comprising a light source means mounted within said boat trailer guide with a protective lens attached at the upper end of said floatable roller such as to illuminate the top of said floatable roller even when extended.

3. A rotatable, telescopically extendable, lighted, boat trailer guide-on comprising:
   (a) a bracket means for attaching to a boat trailer and adapted to hold a shaft means substantially vertical and adjacent to the side of a boat supported on a trailer;
   (b) a shaft means for positioning a floatable and removable cylindrical roller means substantially vertical and adjacent to the side of a boat supported on a trailer;
   (c) a floatable and removable cylindrical roller means concentrically attached to said shaft means such as to simultaneously revolve around and telescopically extend and retract vertically on said shaft means; and
   (d) a light source means for illuminating said roller means.

* * * * *